Aug. 19, 1941.                E. E. ARNOLD                2,253,359
                            CURRENT COLLECTOR
                            Filed May 5, 1939              2 Sheets-Sheet 2

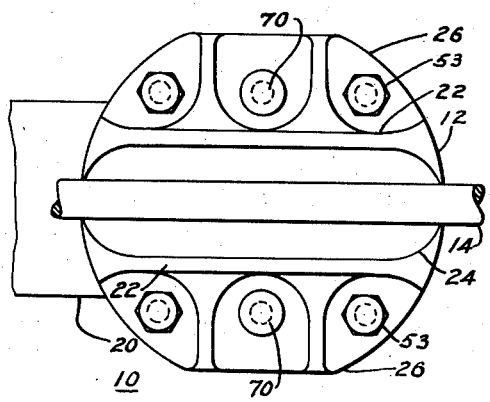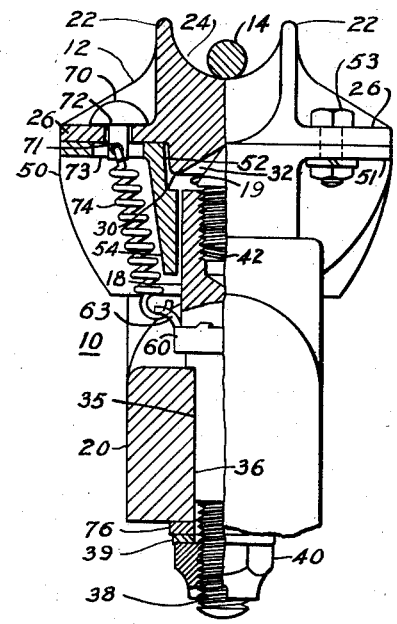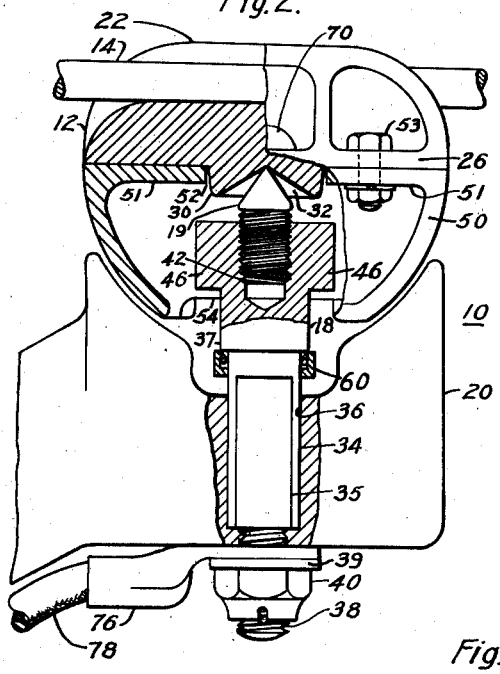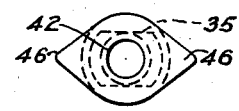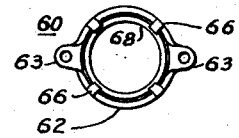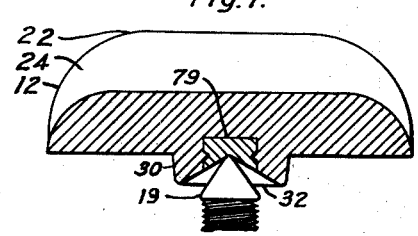

WITNESSES:                                                INVENTOR
                                                      Edwin E. Arnold.
                                                              ATTORNEY Patented Aug. 19, 1941

2,253,359

UNITED STATES PATENT OFFICE 2,253,359

CURRENT COLLECTOR

Edwin E. Arnold, Pittsburgh, Pa., assignor to Westinghouse Electric & Manufacturing Company, East Pittsburgh, Pa., a corporation of Pennsylvania Application May 5, 1939, Serial No. 271,882

14 Claims. (Cl. 191—59.1)

My invention relates, generally, to current collectors, and more particularly, to current collectors of the slider shoe type for collecting current from a conductor for electrically operated vehicles or the like.

In current collectors for collecting current from an overhead trolley conductor for the propulsion of electrically operated vehicles, such as trolley buses, or the like, it has heretofore been considered necessary, in providing for relative movement of the slider shoe, which engages the trolley conductor, and the body member of the current conductor, which is mounted on the trolley pole of the vehicle, not only to provide relatively extensive bearing surfaces therebetween, but also to provide auxiliary current conducting members between the slider shoe and the body member in an effort to reduce the resistance of the current path and minimize the power losses in transmitting current from the slider shoe to the fixed conductor on the trolley pole, by which the power is conducted to the motors and control.

In order to provide for the desired movement of the slider shoe relative to the body member of the current collector, it has been customary to utilize a plurality of engaging arcuate or spherical bearing surfaces between the body member of the current collector and the slider shoe for supporting the slider shoe so that it can move in a plurality of planes relative to the body member. It will be apparent that the provision of such bearing surfaces necessarily increases the manufacturing cost of the current collector, since these relatively extensive bearing surfaces must be accurately machined in order to provide the necessary freedom between the slider shoe and the body member of the current collector.

The use of auxiliary current conducting members, such as shunts, either internal or external, has heretofore been considered necessary in connection with the current collectors of the prior art in order to provide a low resistance path for conducting current from the slider shoe, so as to prevent heating of the current collector and the consequent damage to the engaging bearing surfaces upon which the slider shoe is supported. While the resistance of the current path may be decreased considerably by the use of such auxiliary shunt members, it is obvious that they necessarily add to the cost of manufacture, and are also an additional source of trouble in operation, because of the possibility of their failure under the severe operating conditions to which the current collectors are often subjected.

The object of my invention, generally stated, is to provide a current collector which is simple and inexpensive to manufacture, and which is reliable and efficient in operation.

A more specific object of my invention is to provide for pivotally mounting the grooved slider shoe of a current collector in substantially point contact with a fixed support which functions both to support the slider shoe and conduct current therefrom.

Another object of my invention is to provide for reducing the losses in a current collector by positioning a slider shoe to oscillate on a supporting and conducting member so that the center of oscillation thereof lies on the surface of the support member.

A further object of my invention is to obviate the necessity for auxiliary shunt members in current collectors having pivotally mounted slider shoes, by mounting the slider shoe on a support member having a hardened tip of relatively high electrical conductivity, which also serves as a conductor to collect current from the slider shoe.

Another important object of my invention is to provide for pivotally mounting the slider shoe of a current collector so as to improve the current collecting characteristics of the current collector without requiring complicated machining operations of the parts.

A further object of my invention is to simplify the construction and reduce the cost of manufacture of current collectors having pivotally mounted slider shoes, by eliminating from the design thereof relatively extensive accurately machined spherical and arcuate bearing surfaces.

Still another object of my invention is to provide for pivotally mounting the slider shoe of a current collector so as to eliminate relatively extensive sliding contact surfaces in the path of the current.

Other objects will, in part be obvious, and will, in part appear hereinafter.

In practicing my invention, a grooved slider shoe for engaging a trolley conductor is mounted on the end of a support stem, which is secured to a body member of any suitable type in a manner such as to provide a substantially point contact or engagement between the shoe and stem. The point contact functions not only to mechanically support the shoe on the stem so that it may pivot or oscillate relative thereto, but also to conduct or transmit current from the shoe to the stem and thence to the body member on which the stem is mounted. In a preferred embodiment the point contact mounting may be effected by providing a pointed or conical tip on the support stem which engages the bottom portion of the shoe. In another embodiment of the invention a pointed or conical mounting tip may be provided on the bottom of the shoe which engages the end of the stem. The slider shoe may be secured in operating relation on the support stem by means of a resilient connection therebetween and a depending skirt member may be attached to the slider shoe to engage side portions of the support stem so as to limit the relative movement of the slider shoe and the stem to within desired limits.

For a more complete understanding of the nature and scope of my invention, reference may be had to the following detailed description, taken in connection with the accompanying drawings, in which:

Figure 1 is a plan view of a current collector embodying the principal features of my invention;

Fig. 2 is a side view partly in section and partly in side elevation of the current collector of Fig. 1;

Fig. 3 is an end view partly in section and partly in elevation of the current collector of Fig. 1;

Fig. 4 is a plan view of the support stem on which the slider shoe is mounted;

Fig. 5 is a plan view of one form of retaining member;

Fig. 6 is a side view, in elevation, of the retaining member of Fig. 5;

Fig. 7 is a sectional view of a slider shoe and support stem illustrating a modification of the slider shoe of Figs. 1, 2 and 3;

Figure 8:
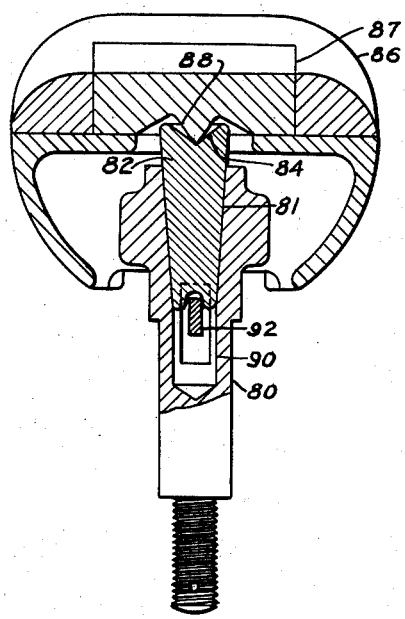
Fig. 8 is a side elevation view partly in section of a current collector embodying a modification of the invention.

Referring particularly to Figs. 1, 2 and 3 of the drawings, the reference numeral 10 denotes generally a current collector for collecting current from a trolley conductor for the propulsion of an electrically operated vehicle, such as a trolley bus, or the like. A grooved slider shoe 12, which is disposed to engage a trolley conductor 14, is pivotally positioned on the support stem 18, which may be mounted on a body member 20 of any suitable type for attachment to a trolley pole (not shown). For example, the support stem 18 may be provided with a substantially pointed contact member 19 on which the slider shoe is positioned, as will be hereinafter explained in detail.

The slider shoe 12, which may be of any suitable metal, such as cast iron, is provided with a pair of upstanding lips 22 on the upper side which define an elongated groove 24 for receiving the trolley conductor 14. Laterally extending flanges 26 are provided adjacent to the base of the lips 22 at each side of the shoe, and a centrally disposed boss 30 is preferably provided on the lower side of the slider shoe, having a recess or depression 32 therein which may, for example, be substantially conical, having sides which present a relatively large angle to each other, the angle therebetween being preferably obtuse, and the surface of which is preferably hardened by any well known treatment.

In order to support the slider shoe 12 on the body member 20, the support stem 18 may be provided with a central cylindrical portion 34 having flattened sides 35, which is disposed to be positioned in a similarly shaped opening 36 in the body member 20, to prevent relative movement therein. A shoulder 37 is provided above the flattened portion and a threaded portion 38 of reduced cross-section is provided at the lower end of the stem 18 for receiving a washer 39 and a nut 40 to secure the stem to the body member. The contact member 19 may be positioned on the stem in any suitable manner, being for example positioned in a socket or a threaded bore 42 provided in the upper end of the support stem. As is shown clearly in Figs. 2, 3 and 4, the upper portion of the support stem 18 is preferably elongated in section, being provided with projecting wing portions 46 on the front and rear sides thereof, which may be utilized in limiting the movement of the slider shoe relative to the support stem in a manner which will be hereinafter explained.

In order to support the slider shoe 12 on the support stem 18 and secure the most satisfactory current conducting, as well as wearing characteristics, the support stem 18 is provided with the contact member 19, which is preferably substantially conical in its vertical section, the angle between the opposite sides being such that the slider shoe 12 may rock thereon without any interference between the sides of the conical depression 32 in the boss 30 and the sides of the contact member. The area of contact of the contact member 19 and the slider shoe 12 will be limited to substantially a point, the surfaces of these members adjacent thereto being inclined to each other so that the slider shoe may rock on the contact member, the center of oscillation being the point of contact therebetween.

In order to secure the best current conducting and wearing characteristics, the contact member 19 is also preferably of a relatively hard material having relatively high electrical conductivity. For example, on a surface of chilled cast iron, alloy cast iron, or hardened steel, a contact member of beryllium-copper gives exceedingly good results. However, it will be apparent that contact members of other relatively hard materials such as the hardened copper and aluminum alloys, molybdenum, and the like, may be used, and that the slider shoe may be made of any material such as cast iron, bronze, aluminum, or any suitable alloy, and inserts provided at the point of contact with the hardened contact member, and it is not my intention to limit my invention to any of the particular combinations of materials disclosed, these being mentioned solely for the purpose of illustrating and describing the invention.

In order to limit the movement of the slider shoe 12 relative to the support stem 18, means such as the skirt member 50, having a substantially flat upper plate portion 51 for engaging the lower surfaces of flanges 26 of the slider shoe 12, and a centrally disposed opening 52 through which the boss 30 projects, may be secured to the lower side of the slider shoe in any suitable manner, such as by the bolts 53. Depending side walls 54 are provided on the skirt member 50 which are in close proximity to the sides of the support stem 18, so as to effectively prevent any rotation of the slider shoe 12 relative to the support stem 18 about a horizontal axis parallel to the groove 24 of the shoe. By providing the support stem 18 with the projecting wing portions 46 on the front and rear sides in the manner shown in Fig. 4, these wing portions 46 engage the depending side walls 54 of the skirt member 50 as the slider shoe 12 and skirt member 50 rotate about the axis of the stem 18, and thus limit rotation of the slider shoe 12 about its vertical axis of support to within desired limits.

In order to secure the slider shoe and the skirt member in operating relation with the support stem and maintain the tip of the contact member 19 in the recess 32, a retaining member 60 as shown in Figs. 5 and 6 is provided. This member may comprise for example, a cupped bearing ring 62 having oppositely positioned projecting ears 63 and peripherally disposed lugs 66 about the sides thereof, the latter being bent inwardly to retain an inner bearing ring 68 in the proper relation thereto. The retaining member 60 is adapted to fit about the support stem 18 adjacent the shoulder 37 thereof. Suitable means such as the headed pins 70 are provided having transverse openings 71 therethrough at the ends, to project through coincident openings 72 and 73 in the flanged side portions 26 of the slider shoe and the plate portion of the skirt member 50, respectively. Resilient means, such as the springs 74, may be connected between the ears 63 of the retaining member 60 and the openings 71 in the ends of the pins 70 to provide a resilient connection therebetween and normally seat the slider shoe 12 on the contact member 19. During operation the contact pressure between the slider shoe 12 and the trolley conductor 14 serves to assist seating the slider shoe on the contact member 19 and increase the contact pressure between them so as to improve the current conductivity therebetween.

In assembling the current collector of my invention, the skirt member 50 may be attached to the slider shoe 12 by means of the bolts 53 which pass through the flanged side portions 26 of the slider shoe and the upper plate portion 51 of the skirt member. The contact member 19 is threaded into the threaded bore 42 in the upper end of the support stem 18 so as to be firmly secured therein, and the retaining member 60 is then positioned on the support stem against the shoulder 37. The slider shoe 12 and the skirt member 50 may then be positioned on the support stem 18 so that the tip of the contact member 19 is centrally located in the conical depression 32 in the boss 30 on the lower side of the slider shoe. The headed pins 70 may be dropped into place in the openings 72 and 73, and the ends of the springs 74 are then hooked through the ears 63 of the retaining member 60 and the openings 71 in the ends of the headed pins. The slider shoe 12 is now operatively positioned on the support stem 18, which may then be positioned in the opening 36 in the body member 20 and secured therein by positioning the terminal 76 of the conductor 78, which connects with the motors and control of the vehicle, on the threaded lower end of the stem, placing the washer 39 and the nut 40 in position and tightening the latter.

In Fig. 7 a modified form of slider shoe construction is shown wherein the slider shoe 12 may be of aluminum or any suitable relatively soft material, while a hardened insert member 79 is provided for engaging the tip of the contact member 19 to provide a bearing therefor.

Figure 9:
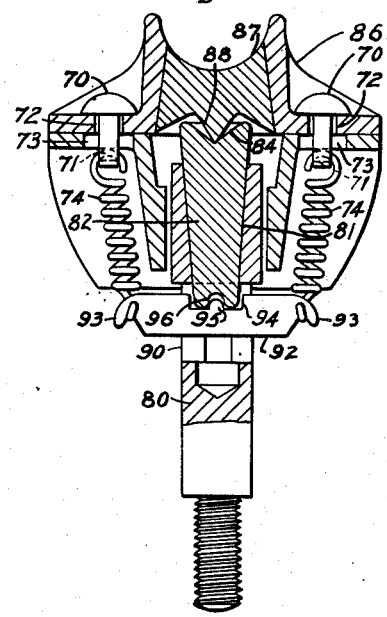
Fig. 9 is an end view partly in section and partly in elevation of the current collector of Fig. 7.

Referring to Figs. 8 and 9, it may be seen that in a modified embodiment of the invention a support stem 80, which is disposed to be secured to a suitable body member 20 in the manner hereinbefore described, is provided with a tapered bore 81, either plain or threaded, at the upper end in which a renewable contact member 82, which has a substantially conical depression 84 at the upper end, the side walls of which are disposed at a relatively great angle to each other, is positioned.

The slider shoe 86, which is substantially the same as the slider shoe 12, hereinbefore described, is provided with an insert 87, preferably of a relatively hard material, which has a substantially conical tip or support member 88 on the lower side. The insert may, for example, project through the body of the slider shoe to provide a wearing surface for the conductor groove 24. The slider shoe 86 is disposed to be mounted on the support stem 80 with the tip 88 positioned in the conical recess 84 of the renewable contact member 82, the sides of the tip 88 being at a relatively small angle to each other so that the shoe may rock freely on the tip 88 without any interference from the sides of the depression 84.

A transverse slot 90 may be provided in the mid-portion of the support stem 80 for receiving a retaining member or yoke 92, which comprises a bar having hooked end portions 93 and a centrally disposed depression 94 in the upper side thereof with a raised projection 95 therein, which is adapted to be positioned in a recess 96 in the lower end of the contact member 82 and prevent lateral movement of the retaining member relative thereto, while allowing a limited degree of rocking motion therebetween. Springs 74 may be utilized in the manner hereinbefore explained, being hooked about the end projections 93 of the retaining member and through the openings 71 in the lower ends of the headed pins 70, in order to secure the slider shoe 86 in operating relation to the support stem 80.

Figure 10:
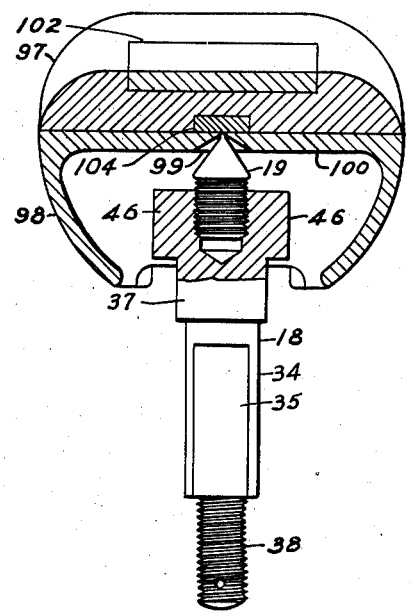
Fig. 10 is a side view partly in section and partly in elevation of a current collector embodying a further modification of the invention.

Referring to Fig. 10, which illustrates a further modification of the invention, it will be seen that a slider shoe 97, generally similar to the slider shoe 12, may be provided having a substantially plane lower surface and a skirt member 98 may be provided, similar in other respects to the skirt member 50, but with a centrally disposed conical opening 99 through the upper plate portion 100 thereof, in which the point of the contact member 19 may be positioned to contact the plane lower surface of the slider shoe 97. The slider shoe 97 may be of a heat treatable metal having hardened surfaces for engaging the trolley conductor 14 and the contact member 16, or may be of a relatively soft metal with hardened wear inserts 102 and 104 for preventing wear at these points. In this manner, the contact tip may be brought into direct engagement with the lower surface of the slider shoe 97 without requiring any particular preparation of the lower surface, since the contact member 19 will engage the lower surface of the shoe at but a single point, and the side walls of the substantially conical opening 99 in the upper plate portion 100 of the skirt member 98 provide guide means for preventing lateral displacement of the point of the contact member from its desired position of contact on the lower plane surface of the slider shoe.

From the above description taken in connection with the accompanying drawings, it will be apparent that I have provided a new and useful method of pivotally supporting the slider shoe of a current collector for engaging a trolley conductor so as to collect current therefrom for the operation of an electrically operated vehicle. By utilizing a support and contact member for supporting the slider shoe so that it pivots with the point of contact with the contact member as the center of oscillation, and conducting the current through this point of contact to a conductor which may be readily secured to the fixed support stem without requiring relatively extensive engaging bearing surfaces, such as heretofore deemed necessary in the art, I have provided a current collector of simplified design which has, by test, proved to have decidedly lower resistance to the flow of current than other types of current collectors heretofore used, and which has shown decidedly improved performance over the current collectors of the prior art under load conditions far more severe than those usually encountered in operation. By utilizing different combinations of materials for the contact tip and the portion of the surface that it engages, improved current conducting and wearing characteristics may be obtained.

Since certain changes may be made in the above construction, and different embodiments of the invention may be made without departing from the spirit thereof, it is intended that all the matter contained in the above description, or shown in the accompanying drawings, shall be considered as illustrative and not in a limiting sense.

I claim as my invention:

1. A current collector comprising a slider shoe having an elongated groove in the upper side and a downwardly projecting pointed portion on the opposite side, an upwardly projecting support stem disposed to engage the pointed portion of the slider shoe in substantially point contact to support the slider shoe for pivotal movement in a plurality of planes in pivoted relation thereto about the point of contact therewith, and means to retain the slider shoe on the support.

2. A current collector comprising, a support member having an upwardly projecting substantially conical tip of a relatively hard material, a slider shoe having a longitudinal groove in the upper side positioned on the tip of the support member, and means securing the slider shoe on said tip for oscillation thereon in a plurality of planes relative to said support member.

3. The combination in a current collector, of a slider shoe having a groove on one side for receiving a trolley wire, a support member engaging the opposite side of the shoe to support the shoe and provide a substantially point contact for collecting current therefrom, means securing the slider shoe on the support member in pivotal relation thereto, and a body member adapted to be mounted on a trolley pole for supporting the support member.

4. The combination in a current collector, of a slider shoe of a relatively soft metal having a groove in the upper side for receiving a trolley wire and a wear insert on the lower side, a conductive support member having a tapered end positioned beneath the slider shoe for substantially point engagement with the wear insert to support the slider shoe and conduct current therefrom, and means associated with the shoe and the support member for securing the shoe in operating relation on the tapered end of the support member for rocking movement in a plurality of planes about said point.

5. The combination in a trolley bus pole head, of a support member having a substantially pointed renewable contact member secured thereto at the upper end, a grooved slider shoe supported on the said contact member to provide a substantially point contact therebetween, and means including resilient retaining means securing the slider shoe to the support member to allow rocking movement of the slider shoe about the said point of contact in a plurality of planes relative to the support member.

6. The combination in a current collector, of a body member, a slider shoe having an elongated groove for engaging a trolley wire, a support member secured to the body member having an upwardly projecting pointed beryllium copper tip at the upper end positioned beneath the slider shoe for supporting the slider shoe for pivotal movement thereon in a plurality of planes relative to the body member and conducting current therefrom, and means securing the slider shoe in operating relation to the support member on the point thereof.

7. A current collector comprising, a grooved slider shoe for engaging a trolley conductor having a relatively shallow recess on the lower side, a support stem having a hardened pointed contact member positioned in the recess at the upper end positioned beneath the slider shoe for pivotally supporting the slider shoe, and means including resilient retaining means to secure the slider shoe on the point of the contact member for universal movement about the point thereof.

8. The combination in a current collector, of a body member adapted to be mounted on a trolley pole, a support stem secured thereto having a substantially conical tip, a slider shoe positioned in point contact with the tip of the support stem, means securing the slider shoe to the support stem in pivotal relation about the point of contact, and means dependent from the shoe to engage the support stem and limit the relative movement of the slider shoe thereto.

9. In a current collector, in combination, a body member adapted to be mounted on a trolley pole, a slider shoe adapted to engage a trolley wire provided with an insert on the lower side thereof, a support member secured to the body member having a portion thereof in substantially point contact with the insert of the slider shoe, and means for securing the slider shoe in pivotal relation to the body member about the point of contact between the slider shoe and the support member.

10. The combination in a current collector, of a slider shoe having an elongated groove in one side for receiving a trolley wire, a body member adapted to be mounted on a trolley pole, a support stem secured to the body member having a substantially conical tip for engaging and supporting the slider shoe, means dependent from the slider shoe to restrict the rotation of the slider shoe about the vertical axis of support and prevent movement of the slider shoe about a horizontal axis parallel to the elongated groove, and means for securing the slider shoe in pivotal relation to the support stem.

11. A current collector comprising, a slider shoe, a pointed support positioned beneath the slider shoe for supporting the slider shoe for universal pivotal movement about the point of said support, a retaining member positioned on the support, and means including laterally positioned spring members cooperative with the retaining member, to secure the slider shoe on the point of the support in operating relation.

12. A current collector comprising, a slider shoe, a support positioned beneath the slider shoe for pivotally supporting the slider shoe in substantially point contact relation thereon for movement in a plurality of planes about said point contact and retaining means including resilient means for yieldingly retaining the slider shoe and the support in point contact relation.

13. A current collector comprising, a slider shoe member, a support member positioned beneath the slider shoe, one of said members having a bearing surface and the other a substantially pointed contact member engaging the bearing surface at substantially a point so as to support the slider shoe on the support member for universal movement about the point of the contact member, and retaining means operatively connecting the slider shoe and the support member to retain the slider shoe and the support member in operating relation.

14. The combination in a current collector, of a slider shoe, a support positioned beneath the slider shoe, a contact member projecting upwardly from the support, a wear member positioned on the lower side of the slider shoe for engaging the contact member, said members having engaging surface portions contacting only at substantially a point and diverging therefrom so as to permit universal rocking movement of the members about the said point of contact, and means to retain the members in operating relation.

EDWIN E. ARNOLD.